(12) United States Patent
Koegel

(10) Patent No.: US 10,245,663 B2
(45) Date of Patent: Apr. 2, 2019

(54) AIRFLOW MANAGEMENT SYSTEM FOR A POWER TOOL

(71) Applicants: ROBERT BOSCH GMBH, Stuttgart (DE); ROBERT BOSCH TOOL CORPORATION, Broadview, IL (US); Jan Koegel, Freudenstadt (DE)

(72) Inventor: Jan Koegel, Freudenstadt (DE)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/108,427

(22) PCT Filed: Dec. 17, 2014

(86) PCT No.: PCT/US2014/070844
§ 371 (c)(1),
(2) Date: Jun. 27, 2016

(87) PCT Pub. No.: WO2015/102906
PCT Pub. Date: Jul. 9, 2015

(65) Prior Publication Data
US 2016/0318109 A1    Nov. 3, 2016

Related U.S. Application Data

(60) Provisional application No. 61/921,759, filed on Dec. 30, 2013.

(51) Int. Cl.
*B23D 59/00* (2006.01)
*B23D 45/06* (2006.01)
*B23D 47/12* (2006.01)

(52) U.S. Cl.
CPC .......... *B23D 59/006* (2013.01); *B23D 45/06* (2013.01); *B23D 47/12* (2013.01)

(58) Field of Classification Search
CPC ...... B23D 59/006; B26D 7/18; B26D 7/1863; B26D 7/1854; Y10T 83/773
See application file for complete search history.

(56) References Cited

U.S. PATENT DOCUMENTS 2,236,232 A * 3/1941 Brescka ................. B24B 55/06
                                                         29/DIG. 78
2,795,254 A * 6/1957 Hill .......................... B26D 1/50
                                                         474/134

(Continued)

FOREIGN PATENT DOCUMENTS

CN      1590050 A    3/2005
CN    103237622 A    8/2013

(Continued)

OTHER PUBLICATIONS

Supplementary European Search Report corresponding to European Patent Application No. 14 87 6880 (12 pages).

(Continued)

*Primary Examiner* — Sean Michalski
*Assistant Examiner* — Fernando Ayala
(74) *Attorney, Agent, or Firm* — Maginot Moore & Beck LLP

(57) ABSTRACT

A table saw includes a lower guard assembly, a first airflow fan, a motor, and a drivetrain system. The lower guard assembly has a dust exhaust chute and is configured to at least partially enclose a lower portion of a saw blade. The first airflow fan is positioned in the lower guard assembly and is configured to produce a first airflow directed through the lower guard assembly toward the dust exhaust chute. The motor is configured to rotationally drive an output shaft, and the drivetrain system connects the output shaft to the first (Continued)

airflow fan and the saw blade to enable the motor to rotationally drive the first airflow fan and the saw blade simultaneously.

15 Claims, 9 Drawing Sheets

(56) References Cited

U.S. PATENT DOCUMENTS

| | | | | |
|---|---|---|---|---|
| 4,809,413 | A * | 3/1989 | Upmeier | B26D 3/162 |
| | | | | 29/2.14 |
| 5,539,985 | A | 7/1996 | Wershe | |
| 5,689,884 | A | 11/1997 | Wershe | |
| 5,779,402 | A * | 7/1998 | Kameda | B23Q 11/006 |
| | | | | 408/56 |
| 6,009,782 | A * | 1/2000 | Tajima | B23D 59/006 |
| | | | | 83/471.3 |
| 6,139,411 | A | 10/2000 | Everts et al. | |
| 8,037,610 | B2 * | 10/2011 | Chambers | B23D 59/006 |
| | | | | 30/124 |
| 2004/0248507 | A1 | 12/2004 | Brazell et al. | |
| 2007/0044609 | A1 | 3/2007 | Brazell et al. | |
| 2008/0244910 | A1 * | 10/2008 | Patel | B23D 45/122 |
| | | | | 30/123 |
| 2008/0307939 | A1 * | 12/2008 | Smith | B26D 5/00 |
| | | | | 83/331 |
| 2010/0307307 | A1 | 12/2010 | Butler | |
| 2012/0036972 | A1 | 2/2012 | Frolov | |
| 2012/0036976 | A1 * | 2/2012 | Frolov | B27G 19/02 |
| | | | | 83/473 |
| 2014/0260848 | A1 * | 9/2014 | Gantke | B26D 7/1863 |
| | | | | 83/24 |
| 2014/0260859 | A1 * | 9/2014 | Doumani | B23D 59/006 |
| | | | | 83/165 |
| 2015/0082958 | A1 * | 3/2015 | Feng | B23D 59/006 |
| | | | | 83/100 |

FOREIGN PATENT DOCUMENTS

| | | |
|---|---|---|
| DE | 19825741 A1 | 12/1998 |
| EP | 2281651 A2 | 2/2011 |
| TW | 201210773 A | 3/2012 |

OTHER PUBLICATIONS

English Translation of First Chinese Office Action corresponding to Chinese Patent Application No. 201480071694.6 (13 pages).
English Translation of Taiwan Examination Report corresponding to Taiwan Patent Application No. 103145668 (5 pages).
International Search Report corresponding to PCT Application No. PCT/US2014/070844, dated Mar. 31, 2015 (3 pages).

* cited by examiner

AIRFLOW MANAGEMENT SYSTEM FOR A POWER TOOL

CLAIM OF PRIORITY

This application is a 35 U.S.C. § 371 National Stage Application of PCT/US2014/070844, filed on Dec. 17, 2014, which claims the benefit of priority to U.S. provisional application No. 61/921,759, entitled "Airflow Management System for a Power Tool" which was filed on Dec. 30, 2013, the disclosures of which are incorporated herein by reference in their entirety.

TECHNICAL FIELD

This disclosure relates generally to power tools, and, more particularly, to airflow management for power tools.

BACKGROUND

Power saws, for example table saws, circular saws, and miter saws, are a type of power tool used for cutting and shaping workpieces such as, hardwood, manufactured wood products, construction lumber, and other materials. The typical power saw includes a circular blade, which rotates to cut through a workpiece during a cutting operation. During the cutting operation, the power saw generates dust and debris as the rotating blade cuts through the workpiece. The dust and debris can interfere with the cutting operation by obstructing the user's view of the workpiece and diffusing into the surrounding air space. Additionally, the dust and debris contaminates the area near the cutting task, necessitating extensive clean up and potentially causing issues with other equipment nearby. Furthermore, the user of the power saw is exposed to the dust and debris, which, in some instances, can cause respiratory issues when inhaled. Accordingly, it is desirable to collect the dust generated by the power saw with a dust collection system.

Dust collection systems vary depending on the type of power saw. Table saws, for example, typically include a source of vacuum that is fluidly connected to the table saw with a vacuum line. In particular, table circular saws include an upper guard and a lower guard, both of which are typically connected to the source of vacuum by a vacuum line. A fan in the motor of the saw serves to both cool the motor and urge dust and debris in the lower guard toward the vacuum line. Airflow generated by the motor fan is limited in the quantity of air it can move, and is limited because the airflow must be proximate to the motor.

It would thus be desirable to provide an improved airflow management system to improve collection of the dust and debris generated during a cutting operation.

SUMMARY

In a first embodiment, a table saw comprises a lower guard assembly including a dust exhaust chute, a first airflow fan positioned in the lower guard assembly, a motor, and a drivetrain system. The lower guard assembly is configured to at least partially enclose a lower portion of a saw blade. The first airflow fan is configured and arranged to produce a first airflow directed through the lower guard assembly toward the dust exhaust chute. The motor configured to rotationally drive an output shaft, and the drivetrain system connects the output shaft to the first airflow fan and the saw blade to enable the motor to rotationally drive the first airflow fan and the saw blade simultaneously.

In another embodiment of the table saw, the motor is positioned in the lower guard assembly and includes a motor casing in which a motor fan is positioned. The motor fan is configured and arranged to produce a second airflow directed toward the dust chute.

In a further embodiment of the table saw, the drivetrain system includes a drivetrain pulley configured to transfer rotational energy from the output shaft to rotate the first airflow fan and the saw blade. The table saw further comprises an idler roller fixed to the first airflow fan and rotatably connected to the drivetrain pulley, and the idler roller is configured to be moved to adjust a tension of the drivetrain pulley.

In one embodiment, the table saw further comprises a second airflow fan configured to produce a third airflow directed through the lower guard assembly toward the dust exhaust chute.

In yet another embodiment, the second airflow fan is formed in one of a planar outer surface of the saw blade and a blade washer configured to configured to fasten the saw blade to a drive shaft, and the second airflow fan is configured to produce the third airflow in at least one of an axial direction of the saw blade and a radial direction of the saw blade.

In a further embodiment, the drivetrain assembly includes a first set of gears configured to transfer rotational energy from the motor to the first airflow fan, and a second set of gears configured to transfer rotational energy from the motor to the second airflow fan.

In some embodiments of the table saw, the second airflow fan is integrally formed on a shaft rotationally fixed to one gear of the second set of gears.

In another embodiment of the table saw, the lower guard assembly includes a dust rip defining an airflow channel configured to direct at least one of the first airflow and the third airflow toward the dust exhaust chute.

In yet another embodiment, the table saw further comprises a first blower assembly and a second blower assembly. The first blower assembly includes the first airflow fan, which is configured to generate a suction in the lower guard assembly to produce the first airflow, and the second blower assembly including the second airflow fan, which is configured to produce the third airflow to blow air into the lower guard assembly.

In some embodiments according to the disclosure, the table saw further comprises at least one airflow converter configured to accelerate and redirect a portion of the first airflow through gullets at an outer circumference of the saw blade in a direction transverse to a plane in which the saw blade is located.

In another embodiment according to the disclosure, a table saw comprises a lower housing assembly defining a volume configured to at least partially enclose a lower portion of a saw blade, a first motor configured to rotationally drive the saw blade, and a first blower assembly including an outlet connected to a first hose, and a first blower configured to generate a suction to produce a first airflow from the volume toward the outlet. A second motor is configured to rotationally drive an output shaft, and a first transmission arrangement is configured to transmit power from output shaft of the second motor to rotationally drive the first blower.

In a further embodiment, the second motor includes a motor casing in which a motor fan is positioned, the motor fan being configured to produce a second airflow.

In another embodiment according to the disclosure, the table saw further comprises a second blower assembly including an inlet and a second blower operably connected to the second motor and configured such that the second motor rotationally drives the second blower to produce a third airflow directed into the lower housing assembly. The table saw further includes a second transmission arrangement configured to transmit power from output shaft of the second motor to rotationally drive the second blower.

In one embodiment of the table saw, the second motor is configured to be activated independently of the first motor.

In another embodiment according to the disclosure, a saw blade fastening system comprises a saw blade and a first blade washer having a first washer body defining a first central aperture. The second blade washer includes a first plurality of fins extending outwardly from the first washer body, and a fastening mechanism extends through the first central aperture to fasten the first blade washer to the saw blade.

In another embodiment, the saw blade fastening system further comprises a damping pad interposed between and directly abutting the first blade washer and the saw blade and configured to reduce transmission of vibrations between the first blade washer and the saw blade.

In yet another embodiment, the saw blade fastening system further comprises a second blade washer having a second washer body defining a second central aperture, and the second blade washer includes a second plurality of fins extending outwardly from the second washer body. The fastening mechanism extends through the second central aperture to fasten the second blade washer to the saw blade and the first and second blade washers are positioned on opposite sides of the saw blade.

In a further embodiment of the saw blade fastening system, each fin of the first plurality of fins is resiliently flexible.

In some embodiments of the saw blade fastening system, the first washer body includes a washer portion and a fan portion, which includes the first plurality of fins. One of the washer portion and the fan portion includes at least one projection, and the other of the washer portion and the fan portion includes at least one indentation. The at least one projection extends into the at least one indentation to rotationally fix the washer portion and the fan portion.

In a further embodiment according to the disclosure, a saw blade includes a blade body defining a central aperture and a cutting edge and including a side surface and a plurality of airflow fins extending from the side surface and configured to generate an airflow as the saw blade rotates about the central aperture.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
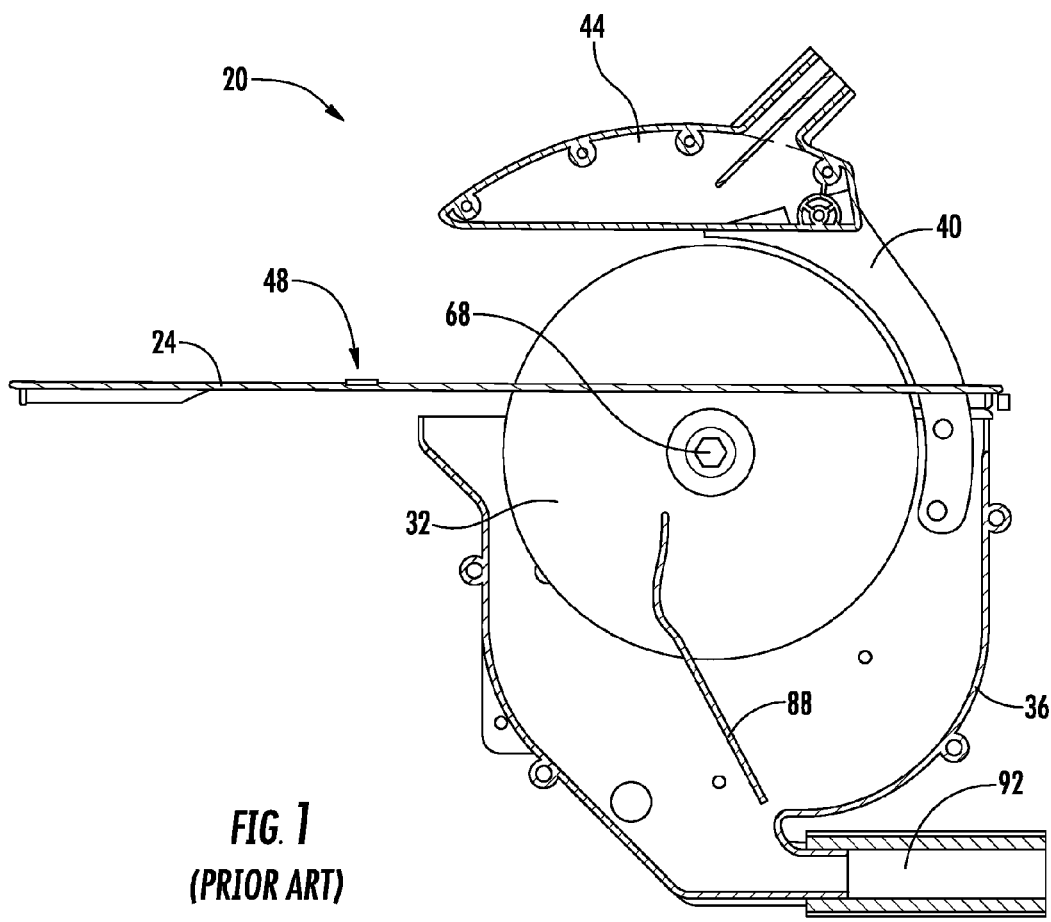
FIG. 1 is a side partial-cutaway view of a conventional table saw.
Figure 2:
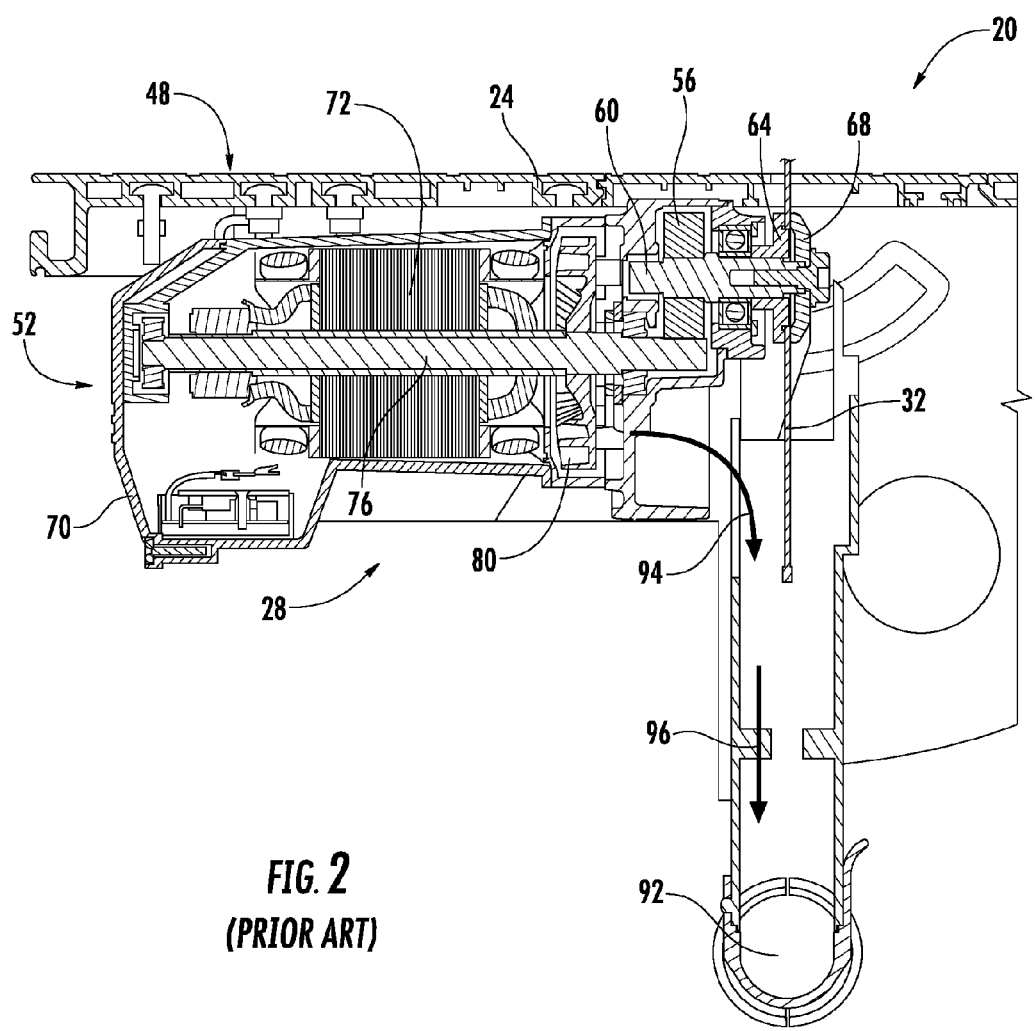
FIG. 2 is a front view of the table saw of FIG. 1.

FIGS. 1 and 2 illustrate a side view and a front view, respectively, of a prior art table saw 20. The table saw 20 includes a table 24, a motor and drivetrain unit 28, a saw blade 32, a lower guard 36, a riving knife 40, and an upper guard 44. The table 24 has an upper table top surface 48 configured to support a workpiece during cutting operations.

The motor and drivetrain unit 28 has a motor 52, a gear 56, an output shaft 60, an inner washer 64, and an outer washer 68. The motor 52 includes a stator 72, a rotor 76, and a cooling fan 80. The cooling fan 80 is fixed to the rotor 76, and rotates to cool the motor as the rotor 76 spins. The rotor 76 includes a geared end 84, which meshes with the gear 56 to rotate the gear 56 as the rotor 76 spins. The gear 56 is affixed to the output shaft 60, which drives the saw blade 32. The inner washer 64 is affixed to the output shaft 60, while the outer washer 68 is positioned outside the saw blade 32, and is configured to be attached to the output shaft 60 by a screw to clamp the saw blade 32 securely to the inner washer 64 so that the saw blade 32 rotates with the output shaft 60.

The lower guard 36 of the table saw 20 has a dust rip 88 and a dust chute 92. The dust rip is configured to guide particulates from the saw blade 32 towards the dust chute 92. The dust chute 92 is connected to a dust storage area (not shown), which stores the dust and particulates for subsequent disposal.

In operation, a user activates the saw with a switch or button (not shown), which energizes the stator 72 of the motor 52. The stator 72 generates a magnetic field, rotating the rotor 76, gear 56, and output shaft 60. The saw blade 32 spins with the output shaft 60 to cut a workpiece positioned on the table top 48 as the workpiece is moved through the saw blade 32.

As the rotor 76 rotates, the cooling fan 80 affixed to the rotor 76 also spins, generating an airflow to keep the components of the motor 52 from overheating. The cooling fan 80 pulls air through the motor 52 and discharges the air toward the saw blade 32, as shown by arrow 94. Dust and particulates from the saw blade 32 cutting the workpiece are urged downwardly by the airflow toward the dust chute 92, as shown by arrow 96.

Figure 3:
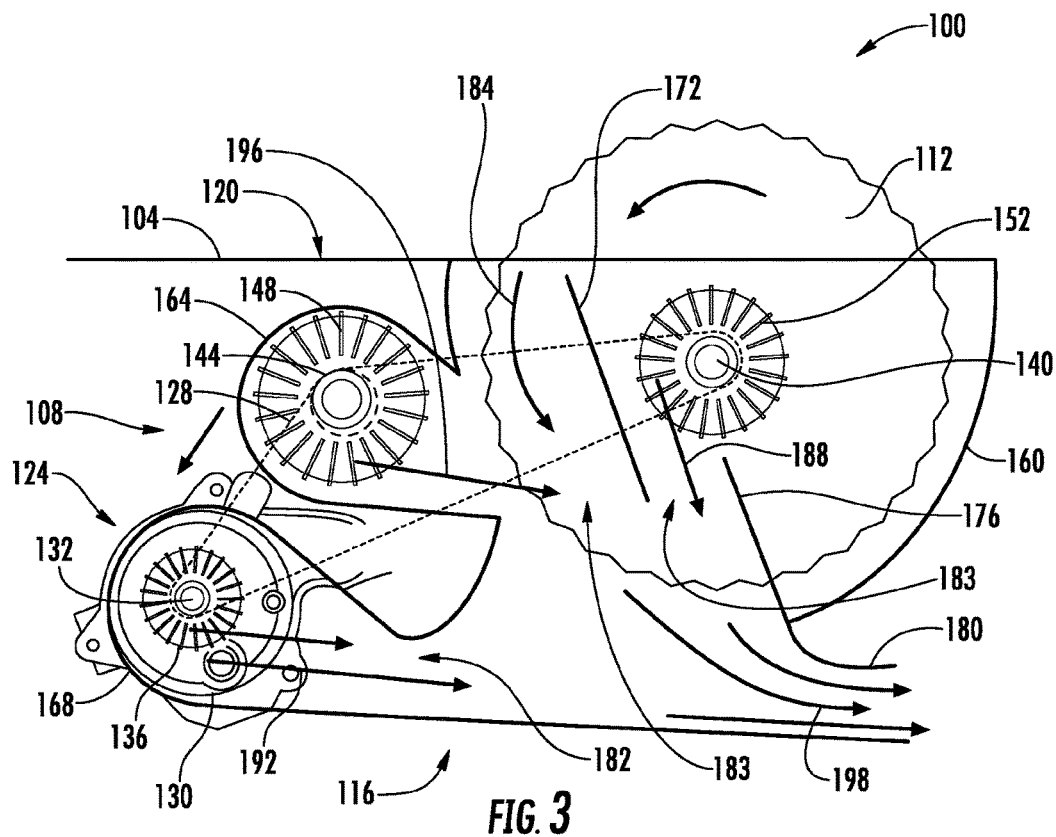
FIG. 3 is a side schematic view of a table saw having additional airflow management.

FIG. 3 is a schematic view of a table saw 100 according to the present disclosure. The table saw 100 includes a table 104, a motor and drivetrain system 108, a saw blade 112, and a lower guard assembly 116. The table 104 has an upper table top surface 120 configured to support a workpiece during cutting operations.

The motor and drivetrain system 108 includes a motor 124 and a drivetrain belt 128. The motor 124 includes a motor casing 130, a motor output shaft 132 extending partially outside the motor casing 130, and a motor fan 136, which is positioned in the motor casing and is fixedly attached to the motor output shaft 132 so that the motor fan 136 rotates with the motor output shaft 132. The drivetrain belt 128 wraps around the motor output shaft 132, a saw blade drive shaft 140, and an idler pulley 144. The idler pulley 144 is movable to enable the drivetrain belt 128 to be tensioned around the motor output shaft 132, the saw blade drive shaft 140, and the idler pulley 144. An idler fan 148 is fixedly attached to the idler pulley 144, such that the idler fan 148 spins as the idler pulley 144 is spun by the drivetrain belt 128.

Figure 4:
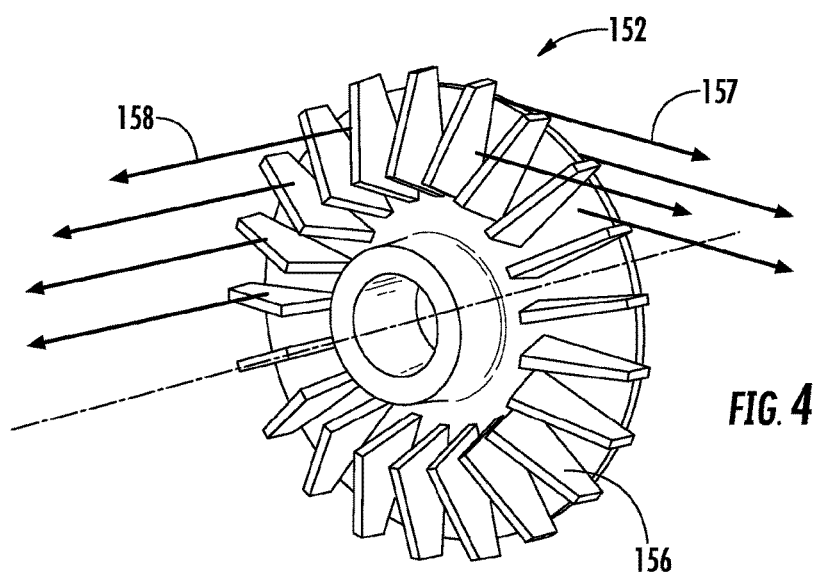
FIG. 4 is a perspective view of a blade washer having airflow fins to facilitate airflow proximate the saw blade in the table saw of FIG. 3.

The saw blade 112 is clamped to the saw blade drive shaft 140 by a blade washer 152 so that the saw blade 112 rotates with the saw blade drive shaft 140. In one embodiment illustrated in FIG. 4, the saw blade washer 140 includes a plurality of airflow fins 156 arrayed around the saw blade washer 152. The airflow fins 156 serve to move air in both the radial direction 157 and the axial direction 158 of the blade washer 152 as the blade washer 152 spins with the saw blade 112.

Referring back to FIG. 3, the lower guard assembly 116 includes a saw blade housing 160, an idler fan housing 164, a motor housing 168, an upper dust rip 172, a lower dust rip 176, and a dust chute 180. The saw blade 112 is positioned in the saw blade housing 160, while the idler pulley 144 and idler fan 148 are locate within the idler fan housing 164 An airflow channel 181 is defined between the idler fan housing 164 and the upper dust rip 172. The motor housing 169 includes the motor 124 and motor fan 136 and defines an airflow channel 182 between the motor 124 and the dust chute 180. The upper and lower dust rips 172, 176 define an airflow channel 183 through which air flows from the blade washer 152 to the dust chute 180. Dust and particulates are pushed through the dust chute 180 where they are subsequently collected.

In operation, the table saw 100 is activated by a user pressing a button or activating a switch (not shown). The motor 124 spins the output shaft 132, turning the drivetrain belt 128 counter-clockwise in the view of FIG. 3. The drive belt 132 turns the saw blade drive shaft 140, which spins the saw blade 112 in the counter-clockwise direction in the view of FIG. 3 to cut a workpiece (not shown) on the table top 120.

As the saw blade 112 rotates, the movement of the teeth of the saw blade generates a flow of air shown by arrow 184. Additionally, the finned blade washer 152 spins and moves air between the upper and lower dust rips 172, 176, as shown by arrow 188. The spinning motor output shaft 132 causes the motor fan 136 to spin, generating air flow 192 directed from the motor housing 168 toward the dust chute 180.

As the drive belt 128 moves, the contact between the drivetrain belt 128 and the idler pulley 144 rotates the idler pulley 144 and idler fan 148. The rotation of the idler fan 148 generates an airflow 196 toward the blade, which is deflected downwardly by the airflow 184 from the saw blade 112 and the upper dust rip 172 toward the dust chute 180. The airflows 184, 188, 192, and 196 generated by the blade 112, washer 140, and fans 136, 148 combine to form a combined airflow 198 to push dust and debris out the dust chute 180 for subsequent collection.

Figure 5:
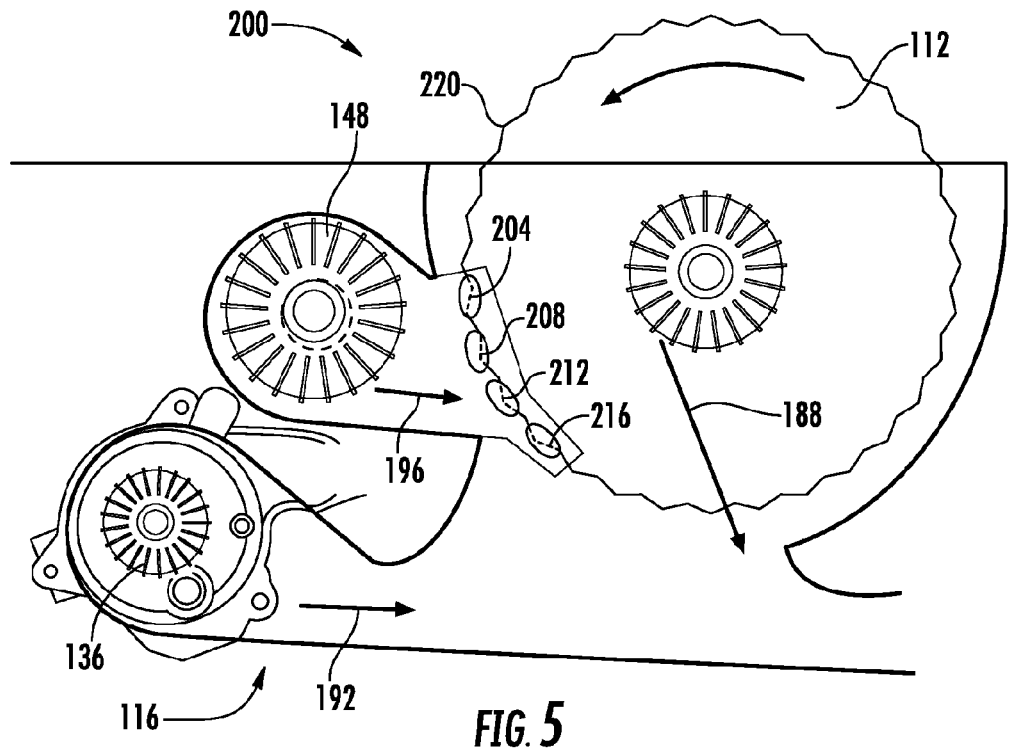
FIG. 5 is a side schematic view of another table saw having air converters.

FIG. 5 illustrates another embodiment of a table saw 200 according to the present disclosure. The table saw 200 is substantially the same as the table saw 100 described above with reference to FIGS. 3 and 4. The table saw 200 includes air converters 204, 208, 212, and 216. The air converters 204, 208, 212, 216 are configured to receive at least a portion of the air flow 196 generated by the idler fan 148. The converters 204, 208, 212, 216 may be mounted to a side surface (not shown) of the lower guard assembly 116, or to any other suitable structure proximate the saw blade 112. The air converters 204, 208, 212, 216 redirect the air and narrow the passage through which the air flows, thereby increasing the velocity of the airflow via the Venturi effect. In one embodiment, the airflow is directed perpendicular to the saw blade 112, though in other embodiments the airflow may be directed at another angle to the saw blade 112. The airflow redirected by the air converters 204, 208, 212, and 216 removes dust and debris collected in gullets between teeth 220 of the saw blade 112. In the illustrated embodiment, four air converters 204, 208, 212, 216 are shown, though in other embodiments any desired number of air converters may be used. Additionally, in some embodiments, air converters are positioned to redirect airflow 188 from the saw blade washer 152 or air converters may be positioned to redirect airflow 192 from the motor fan 136 through the gullets in the saw blade 112.

Figure 6:
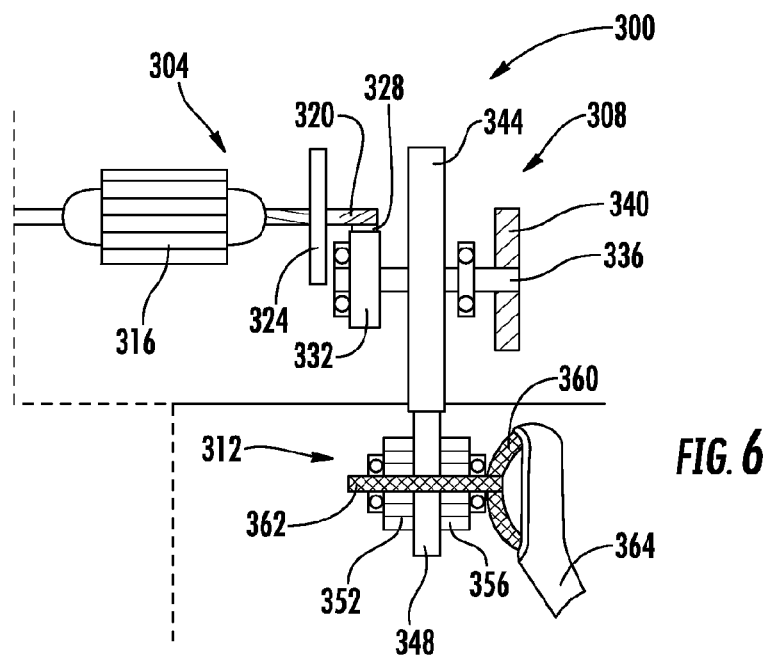
FIG. 6 is a side schematic view of an airflow management system for a power saw.

FIG. 6 illustrates an airflow management system 300 for a power saw according to a further aspect of the present disclosure. The airflow management system 300 includes a motor assembly 304, an drivetrain or drive shaft assembly 308, and a dust collection assembly 312. The motor assembly 304 includes a motor 316, having a motor output shaft 320. The motor output shaft 320 includes a motor fan 324 affixed thereto to generate airflow to cool the components of the motor 316. The motor output shaft 320 further includes a geared end 328.

The drive shaft assembly 308 includes a first gear 332, a drive shaft 336, a drive shaft fan 340, and a second gear 344. The first gear 332 is affixed to the drive shaft 336 and is configured to mesh with the geared end 328 of the motor output shaft 320 to enable rotation of the motor output shaft 320 to rotate the first gear 332 and the drive shaft 336. The drive shaft fan 340 is connected to the end of the drive shaft 336 and, in various embodiments, may be an axial fan, a radial fan, or a combination of an axial and a radial fan. In one embodiment, the drive shaft fan 340 may be integral with a blade washer for the saw blade (not shown), similar to the blade washer 152 illustrated in FIG. 4. In such embodiments, the drive shaft 336 may be connected to a saw blade, for example the saw blade 112 discussed above with regard the embodiments of FIGS. 3 and 5, to rotationally drive the saw blade. The second gear 344 is affixed to the drive shaft 336, and rotates with the drive shaft 336.

The dust collection assembly 312 includes a third gear 348, a first fan 352, a second fan 356, and a propeller 360, all of which are rotationally fixed to a drive shaft 362. The third gear 348 meshes with the second gear 344, which transfers rotational motion of the drive shaft 336 to the third gear 348. The first and second fans 352, 356 are positioned on opposite sides of the third gear 348 and are configured to move air toward the propeller 360. The propeller 360 is connected to the third gear 348 and rotates with the third gear 348. The propeller 360 has a plurality of airfoil blades to blow air toward an output hose 364, which is connected to a dust collection bag (not shown) for collecting dust generated by cutting operations. When the saw is not in use, the hose 364 can be disconnected from the dust collection bag and used as a blower to clean a work area in which the table saw is located. In one embodiment, the airflow from the propeller is directed at an air diverter instead of a hose, while in another embodiment the airflow is directed at a deflector.

Figure 7:
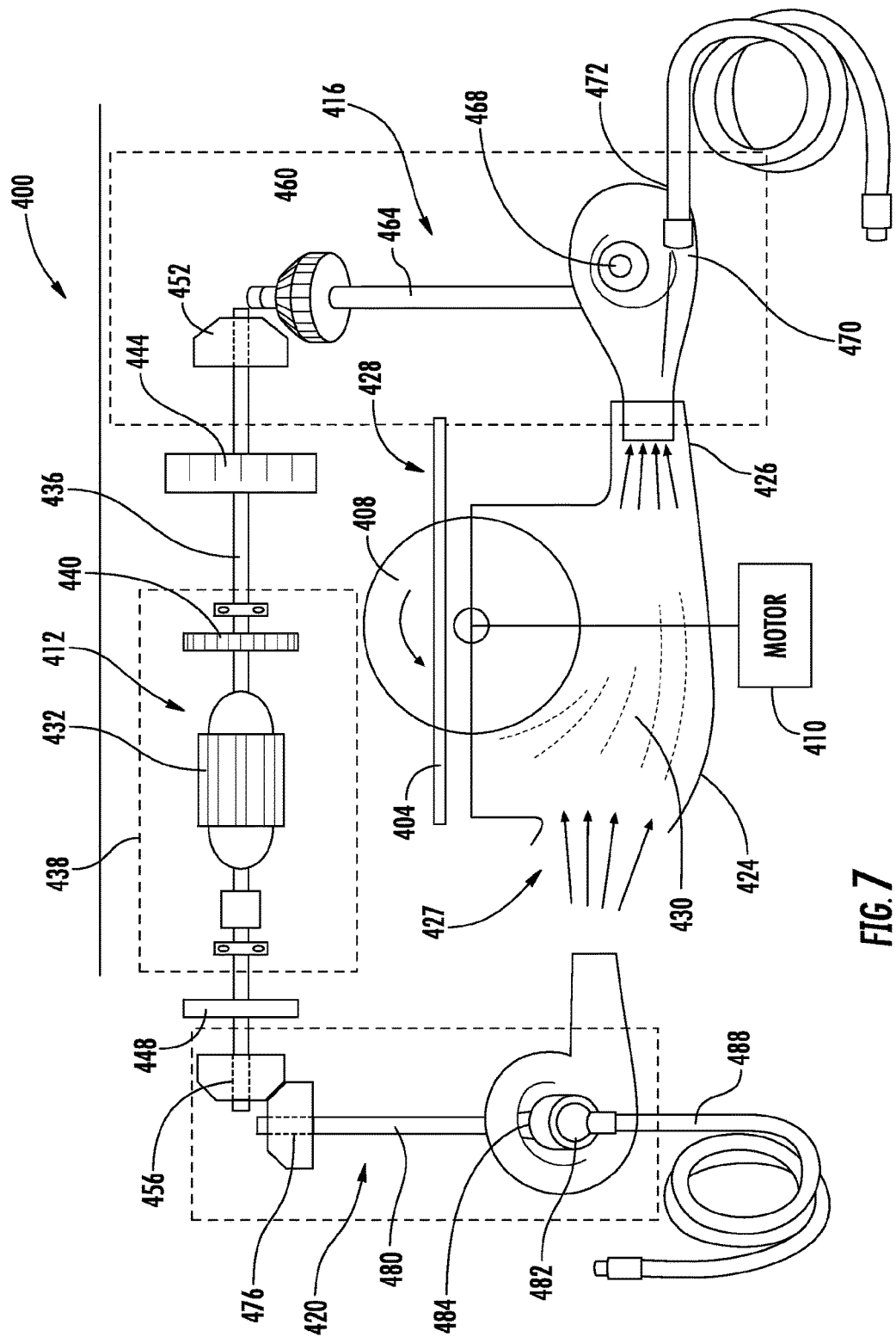
FIG. 7 is a schematic view of a table saw having an airflow management system.

FIG. 7 is a schematic diagram of a table saw 400 according to another aspect of the disclosure. The table saw 400 includes a table 404, a saw blade 408, a motor assembly 412, a first blower assembly 416, a second blower assembly 420, and a lower guard housing 424. The table 404 has a top surface 428 configured to support a workpiece during cutting operations. The saw blade 408 is positioned partially within a volume 430 enclosed by the lower guard housing 424 and protrudes partially through top surface 428 to enable the saw blade 408 to cut a workpiece moved across the table top surface 428. The housing 424 further includes a dust exhaust chute 426 connected to the first blower assembly 416 and an air inlet 427 fluidly connected to the second blower assembly 420.

The motor assembly 412 includes an armature 432 configured to rotate a motor output shaft 436. The motor output shaft 436 extends from both ends of the armature 432 outside of a motor casing 438. The motor output shaft 436 is fixedly connected to a first motor fan 440, which is internal to the motor casing 438, a second motor fan 444, which is external to the motor casing 438 on a first side of the armature 432 in the illustrated embodiment, and a third motor fan 448, which is external to the motor casing 438 on a second side of the armature 436 in the illustrated embodiment. In some embodiments, one or both of the second and third motor fans 444, 448 may be positioned within the motor casing 438. The second and third motor fans 444, 448 may be configured to cool the components of the motor or may be configured to direct airflow to other components of the table saw 400, for example the lower guard housing 424.

A first motor bevel gear 452 is affixed to the motor output shaft 436 at a first end of the motor output shaft 436, while a second motor bevel gear 456 is affixed to a second end of the motor output shaft 436. In the embodiment of FIG. 7, the motor assembly 412 is separate from a motor 410 that spins the saw blade 408. In some embodiments, the motor assembly 412 may include an additional gear assembly to enable the motor assembly 412 to operate the saw blade 408 in addition to the blowers 468, 484.

The first blower assembly 416 has a first blower bevel gear 460, a first blower drive shaft 464, a first blower 468, an exhaust chute 470, and a first hose 472. The first blower bevel gear 460 is configured to mesh with the first motor bevel gear 452 to receive rotational motion from the motor output shaft 436 and transfer the motion to the attached first blower drive shaft 464. The first blower drive shaft 464 is attached to a fan (not shown) in the first blower 468 to generate an airflow from the lower guard housing 424 through dust exhaust chute 426 and the hose connection 470 into the first hose 472.

The second blower assembly 420 has a second blower bevel gear 476, a second blower drive shaft 480, an inlet 482, a second blower 484, and a second hose 488. The second blower bevel gear 476 is configured to mesh with the second motor bevel gear 456 to receive rotational motion from the motor output shaft 436 and transfer the motion to the attached second blower drive shaft 480. The second blower drive shaft 480 is attached to a fan (not shown) in the second blower 484 to generate an airflow from the second hose 488 through the inlet 482 and the blower 484 toward the lower guard housing 424.

The reader should appreciate that in some embodiments, the motor output shaft 436 may be connected to the first and second blower assemblies 416, 420 by a belt drive system, another type of gear system, or any other desired power transmission system in place of the bevel gear systems depicted in FIG. 7. In some embodiments, the table saw 400 includes only one of the first blower assembly 416 and the second blower assembly 420.

In operation, a workpiece is placed on the table top surface 428, and a user activates the motor 410 to spin the saw blade 408 for a cutting operation. As the cutting operation is in progress, the motor armature 432 is activated, spinning the motor output shaft 436, which turns the motor fans 440, 444, 448 and the motor bevel gears 452, 456. The motor bevel gears 452, 456 cause the blower bevel gears 460, 476, respectively, to rotate, spinning the blower drive shafts 464, 480 and the blower fans 468, 484. The second blower 484 generates an airflow from the second hose 488, which pulls air from outside the table saw 400, through the inlet opening 427 into the lower guard housing 424. The first blower 468 generates a suction in the lower guard housing 424 directed toward the first hose 472. The combination of the airflow generated by the first and second blowers 468, 484 urges dust and debris in the volume 430 in the lower guard housing 424 through the dust chute 426, the exhaust chute 470 and into the first hose 472, which is connected to a dust collection receptacle (not shown) to store the dust until disposal.

In some embodiments, the motor armature 432 may be activated when the saw blade 408 is not performing a cutting operation. The airflow flowing from the second hose 488 through the undercarriage housing 424 and to the first hose 472 enables the second hose to be used as a vacuum to clean the area around the table saw 400. Alternatively, in some embodiments the first hose 472 can be uncoupled from the dust collection receptacle and used as a blower in the area near the table saw 400.

While the embodiment illustrated in FIG. 7 depicts the second blower 484 blowing air through the lower guard housing 424 and the first blower 468 pulling air from the lower guard housing 424, in some embodiments either of the first and second blowers 468, 484 may be selectively configured to blow air into the lower guard housing 424, pull air from the lower guard housing 424, or be deactivated in order to generate the desired airflow for a particular cutting or cleaning operation.

Figure 8:
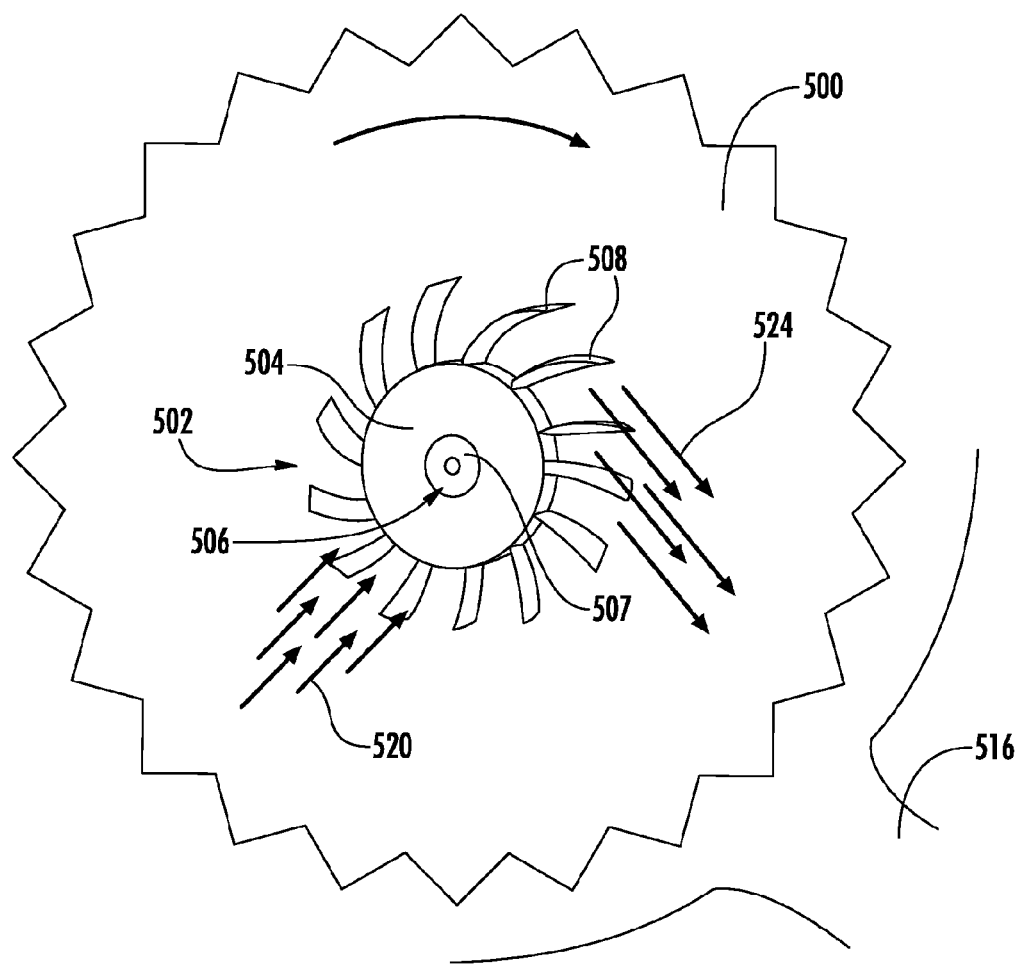
FIG. 8 is a side schematic view of a power saw blade having a blade washer with airflow fins.
Figure 9:
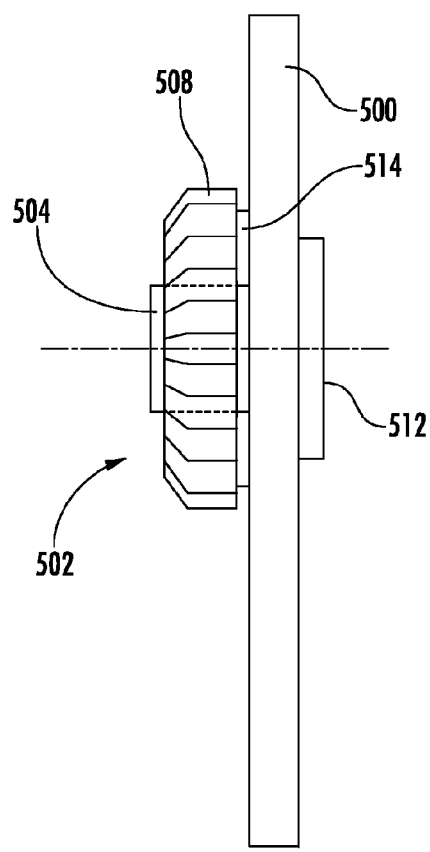
FIG. 9 is a front view of the power saw blade of FIG. 8 with the blade washer having airflow fins.

FIGS. 8 and 9 illustrate a saw blade 500 for a table saw, such as the table saw 100 discussed above with reference to FIG. 3, having a blade locking mechanism 502 including a blade washer 504 with an integrated fan. The blade washer 504 defines a central aperture 506 through which a bolt or other locking mechanism 507 extends to clamp the saw blade 500 to the output shaft (not shown) of the saw drivetrain, as discussed above with regard to the saw 100 of FIG. 3. The blade washer 504 may include a plurality of airflow fins 508 spaced around a circumference of the blade washer 504 and extending from the outer circumference of the washer 504 to accelerate and redirect air, as shown in FIG. 8. In some embodiments, a counter-balance 512 (FIG. 9) may be included on a side of the saw blade 500 opposite the washer 504. The counter-balance prevents the saw blade 500 from vibrating due to the larger size of the blade washer 504 having the integrated fan. In some further embodiments, a damping pad 514 may be arranged between the blade washer 504 and the saw blade 500 to dampen the frequency of vibration of the saw blade 500 and/or the blade washer 504 and increase friction between the saw blade 500 and the washer 504.

Operation of the saw blade 500 having the blade washer 504 is shown in FIG. 8. The saw motor (not shown) drives the saw blade 500 and a motor fan (not shown), which generates an airflow 520 directed toward the saw blade 500. As the washer 504 spins with the saw blade 500, the airflow fins 508 collect the air stream 520 from the motor, accelerate the air, and direct an air stream 524 towards a dust port hose 516. Dust and debris generated during the cutting operation is urged by the air stream 524 toward the dust port hose 516.

Figure 10:
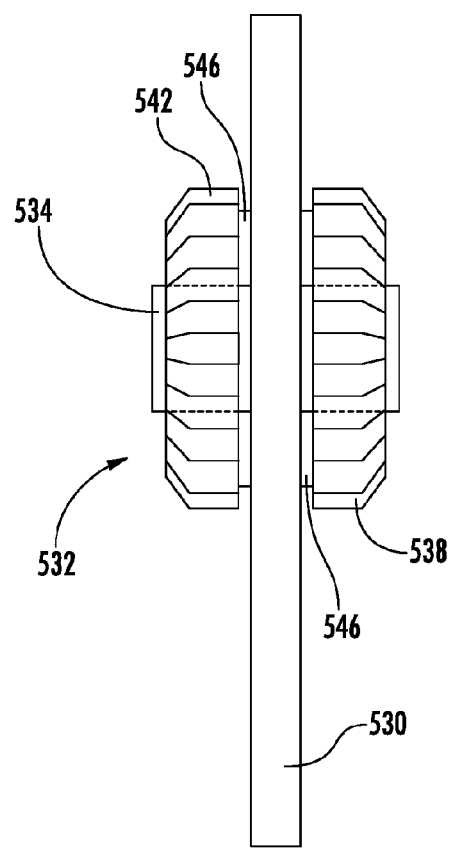
FIG. 10 is a front view of another power saw blade having blade washers with airflow fans on each side of the saw blade.

FIG. 10 illustrates a front view of another saw blade 530 having a blade locking arrangement 532 with blade washers 534, 538 on each side of the saw blade 530. The blade washers 534, 538 are substantially identical to the blade washer 504 described above with regard to FIGS. 8 and 9. Each blade washer 534, 538 has a plurality of airflow fins 542 extending around a circumference of the washer to direct airflow as the saw blade 530 spins. In addition, a damping pad 546 is arranged between each of the blade washers 534, 538 and the saw blade 530 to dampen the frequency of vibration of the saw blade 530 and increase friction between the saw blade 530 and the washers 534, 538 and reduce or eliminate slipping of the washers 534, 538 relative to the saw blade 530.

Figure 11:
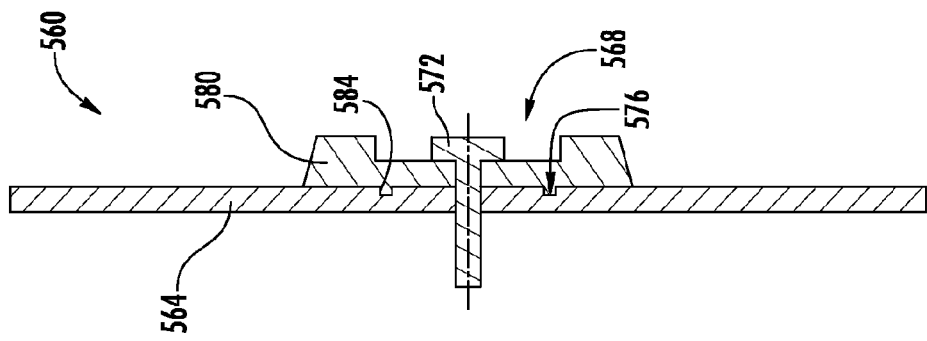
FIG. 11 is a front view of another power saw blade having a blade washer with airflow fins.

FIG. 11 illustrates a front cross-sectional view of another embodiment of a saw blade locking system 560 for locking a saw blade 564 to a driveshaft. The system 560 includes a blade washer 568 and a screw or bolt 572. The saw blade 564 is substantially the same as the saw blades discussed above, except that the saw blade 564 includes indentations 576 arrayed in the surface against which the blade washer 568 contacts. In the illustrated embodiment, the saw blade 564 may include two indentations 576, though the saw blade 564 may include any desired number of indentations 576 in other embodiments.

The washer 568 has airflow fins 580, which are similar to the airflow fins 154 described above with regard to the washer of FIG. 4, to generate airflow around the saw blade 564. The washer 568 further includes protrusions 584, which correspond to the indentations 576 of the saw blade 564 so that the protrusions 584 penetrate into the indentations 576 to rotationally lock the washer 568 to the saw blade 564. The fastener 572 clamps the washer 568 and saw blade 564 to a threaded hole (not shown) in a drive shaft (not shown) of the saw. The fastener 572 may be a screw or a bolt, or other conventional fastener for fixing the washer and the blade to a drive shaft, or the fastener may be incorporated into the washer 580.

Figure 12:
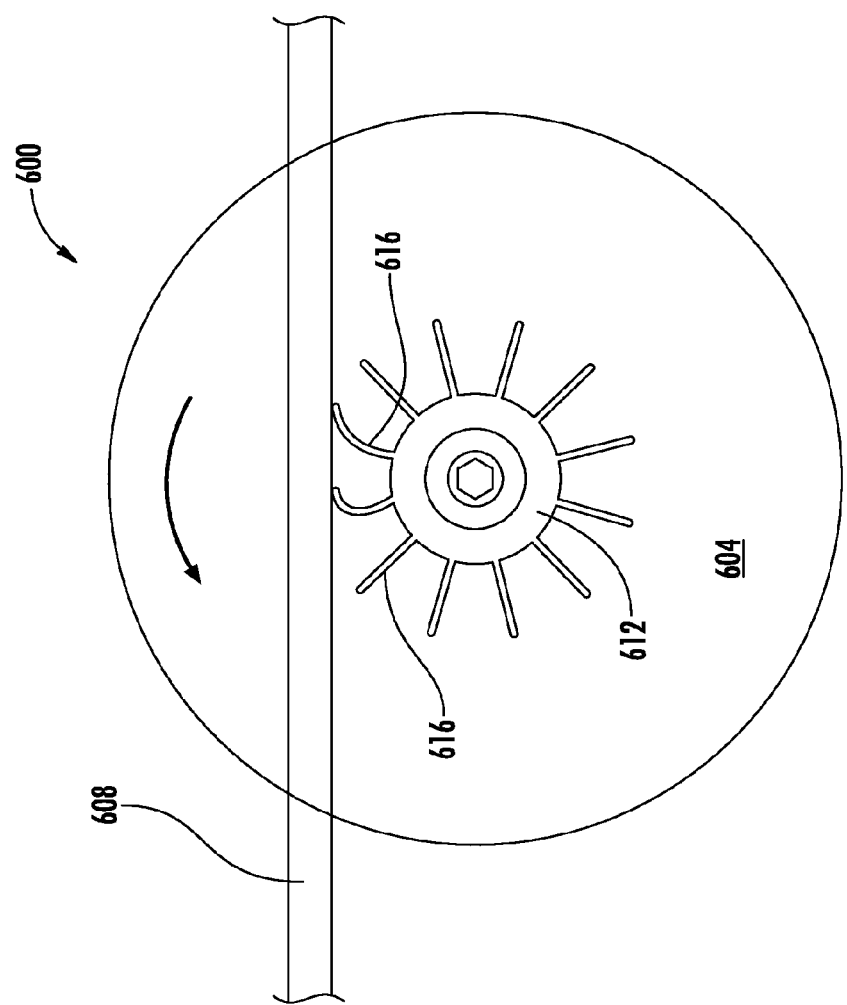
FIG. 12 is a side view of a power saw blade having a blade washer with flexible airflow fins.

FIG. 12 illustrates a side view of another washer and saw blade system 600. The system 600 includes a saw blade 604 extending above a table 608 on which a workpiece is supported and guided. A blade washer 612 clamps the saw blade 604 to a drive shaft (not shown) of the saw. The blade washer 612 includes flexible airflow fins 616 extending from the outer circumference of the washer 612 to generate an airflow as the saw blade 604 spins. In some embodiments, the airflow fins 616 may be formed of a flexible plastic or a elastomeric rubber. The airflow fins 616 are configured to deform upon contact with the bottom side of the table 608 so that neither the airflow fins 616 nor the table 608 are damaged when the airflow fins 616 contact the table 608. This enables the saw blade 604 to be raised to a position above the table to allow the saw blade 604 to cut a workpiece having a greater thickness without sacrificing the cooling effect of the airflow fins 616. The fins 616 may be resiliently flexible to return to their extended position upon moving out of contact with the table 608, increasing the speed of the airflow generated proximate the table 608, where the cutting operation is taking place.

Figure 13:
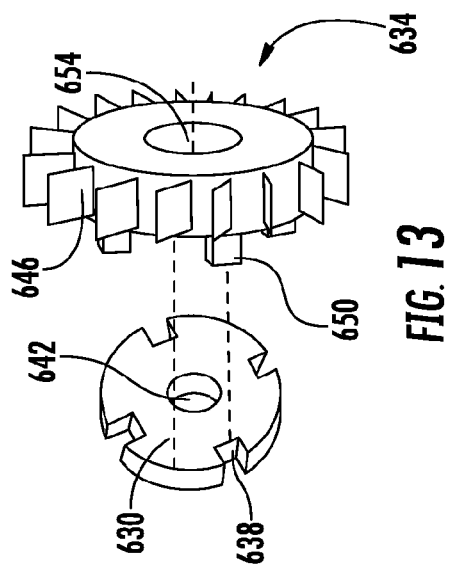
FIG. 13 is an exploded perspective view of a washer and fan assembly for a power saw.
Figure 14:
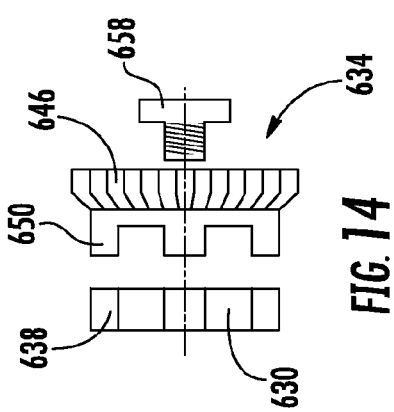
FIG. 14 is an exploded side view of the washer and fan assembly of FIG. 13.

FIGS. 13 and 14 illustrate a blade washer 630 and fan 634 formed as two separate parts. The blade washer 630 includes indentations 638 spaced around the outer circumference of the washer 630 and a central hole 642 extending through the washer 630. The fan 634 has a plurality of airflow fins 646 extending around the outer circumference of the fan 634 to generate airflow as the fan 634 rotates. The fan 634 further includes a plurality of protrusions 650 configured to extend into the indentations 638 of the washer 630 to rotationally lock the fan 634 to the washer 630 so that the fan 634 rotates with the washer 630 and attached saw blade (not shown). The fan 634 includes a central hole 654, which aligns with the central hole 642 of the washer 630, and a fastener 658 extends through the central holes 642, 654 and into a drive shaft (not shown) of saw to clamp the washer 630 and fan 634 to a saw blade (not shown).

Figure 16:
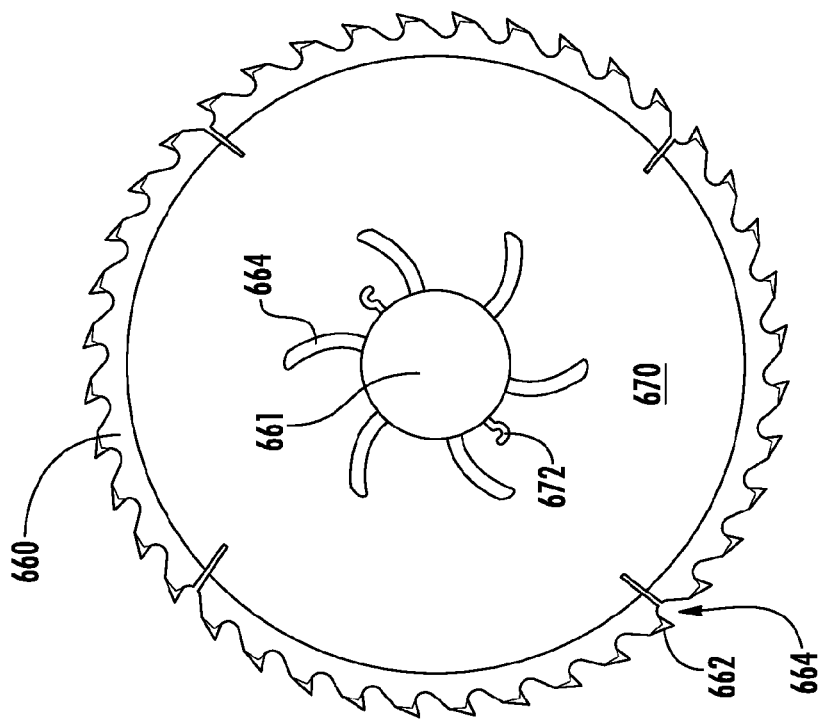
FIG. 16 is a side view of the power saw blade of FIG. 15.
Figure 15:
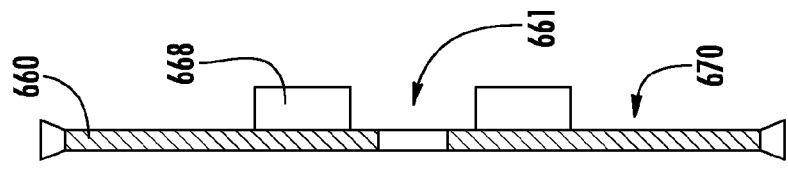
FIG. 15 is a front view of a power saw blade having integrated airflow fins.

FIGS. 15 and 16 illustrate a saw blade 660 having an integrated fan formed on a surface of the saw blade 660. The saw blade 660 includes a central aperture 661, a plurality of blade tips 662 defining cutting edges, and defines a gullet 664 positioned between each pair of blade tips 662. A plurality of airflow fins 668 are integrally formed on the saw blade 660, projecting outwardly from a side surface 670 of the saw blade 660. The airflow fins 664 are configured to generate airflow in a manner similar to the blade washers having airflow fins described above. In some embodiments, the airflow fins 664 are welded onto the outer surface 670 of the blade 660, while in other embodiments, the airflow fins 668 are pressed out of or forged in the body of the blade 660. In one embodiment, the saw blade 660 further includes tension openings 672 between the airflow fins 668 formed on the saw blade 660 to reduce tension in the saw blade 670 during rotation, which can cause damage to the saw blade 660. In some embodiments, the airflow fins 668 may be punched out from the saw blade 660 such that the indentations adjacent the punched out fins serve as tension openings, so that additional tension openings are not necessary.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A table saw comprising:
  a lower guard assembly including a dust exhaust chute, the lower guard assembly being configured to at least partially enclose a lower portion of a saw blade;
  a first airflow fan positioned in the lower guard assembly and configured and arranged to produce a first airflow directed through the lower guard assembly toward the dust exhaust chute;
  a second airflow fan positioned in the lower guard assembly and configured to produce a second airflow directed through the lower guard assembly toward the dust exhaust chute, the first and second airflows forming a combined airflow directed toward the dust exhaust chute;

a motor configured to rotationally drive an output shaft; and a drivetrain system connecting the output shaft to the first airflow fan and the saw blade to enable the motor to rotationally drive the first airflow fan, the second airflow fan, and the saw blade simultaneously.

2. The table saw of claim 1, wherein:

the motor is positioned in the lower guard assembly and includes a motor casing in which a motor fan is positioned, and the motor fan is configured and arranged to produce a third airflow directed toward the dust exhaust chute, the first, second, and third airflows forming the combined airflow toward the dust exhaust chute.

3. The table saw of claim 2, wherein:

the drivetrain system includes a drivetrain belt configured to transfer rotational energy from the output shaft to rotate the saw blade, the table saw further comprises an idler pulley roller fixed to the first airflow fan and rotatably connected to the drivetrain belt such that rotation of the drivetrain belt causes rotation of the idler pulley roller and the first airflow fan, and wherein the idler pulley roller is configured to be moved to adjust a tension of the drivetrain belt.

4. The table saw of claim 1, wherein:

the second airflow fan is formed in one of a planar outer surface of the saw blade and a blade washer configured to fasten the saw blade to a drive shaft, and the second airflow fan is configured to produce the second airflow in at least one of an axial direction of the saw blade and a radial direction of the saw blade.

5. The table saw of claim 1, the drivetrain system further comprising:

a first set of gears configured to transfer rotational energy from the motor to the first airflow fan, and a second set of gears configured to transfer rotational energy from the motor to the second airflow fan.

6. The table saw of claim 5, wherein the second airflow fan is integrally formed on a shaft rotationally fixed to one gear of the second set of gears.

7. The table saw of claim 6, wherein the lower guard assembly includes a dust rip defining an airflow channel configured to direct the first airflow and the second airflow downwardly toward the dust exhaust chute.

8. The table saw of claim 1, further comprising:

a first blower assembly including the first airflow fan, which is configured to generate a suction in the lower guard assembly to produce the first airflow; and a second blower assembly including the second airflow fan, which is configured to produce the second airflow to blow air into the lower guard assembly.

9. The table saw of claim 1, further comprising:

at least one airflow converter configured to accelerate and redirect a portion of the first airflow through gullets at an outer circumference of the saw blade in a direction transverse to a plane in which the saw blade is located.

10. The table saw of claim 1, wherein the first airflow is directed toward the saw blade, and the second airflow redirects the first airflow toward the dust exhaust chute.

11. The table saw of claim 2, wherein the motor fan is coaxial with the output shaft, and the first and second airflow fans have respective first and second rotational axes that are spaced apart from the output shaft.

12. The table saw of claim 3, wherein:

the lower guard assembly further comprises a first dust rip and an idler housing;

the idler pulley roller and first airflow fan are arranged in the idler housing; and the first dust rip and the idler housing define a first airflow channel through which the first airflow flows from the first airflow fan to the dust exhaust chute.

13. The table saw of claim 12, wherein:

the lower guard assembly further comprises a second dust rip; and the first and second dust rips define a second airflow channel through which the second airflow flows from the second airflow fan to the dust exhaust chute.

14. The table saw of claim 13, wherein the lower guard assembly further comprises a saw blade housing in which the saw blade is at least partially enclosed, the first and second dust rips being positioned in the saw blade housing.

15. The table saw of claim 14, wherein the lower guard assembly further comprises a motor housing in which the motor and motor fan are arranged, the motor housing and the saw blade housing defining a third airflow channel through which the third airflow flows from the motor fan to the dust exhaust chute.

* * * * *